2,713,695

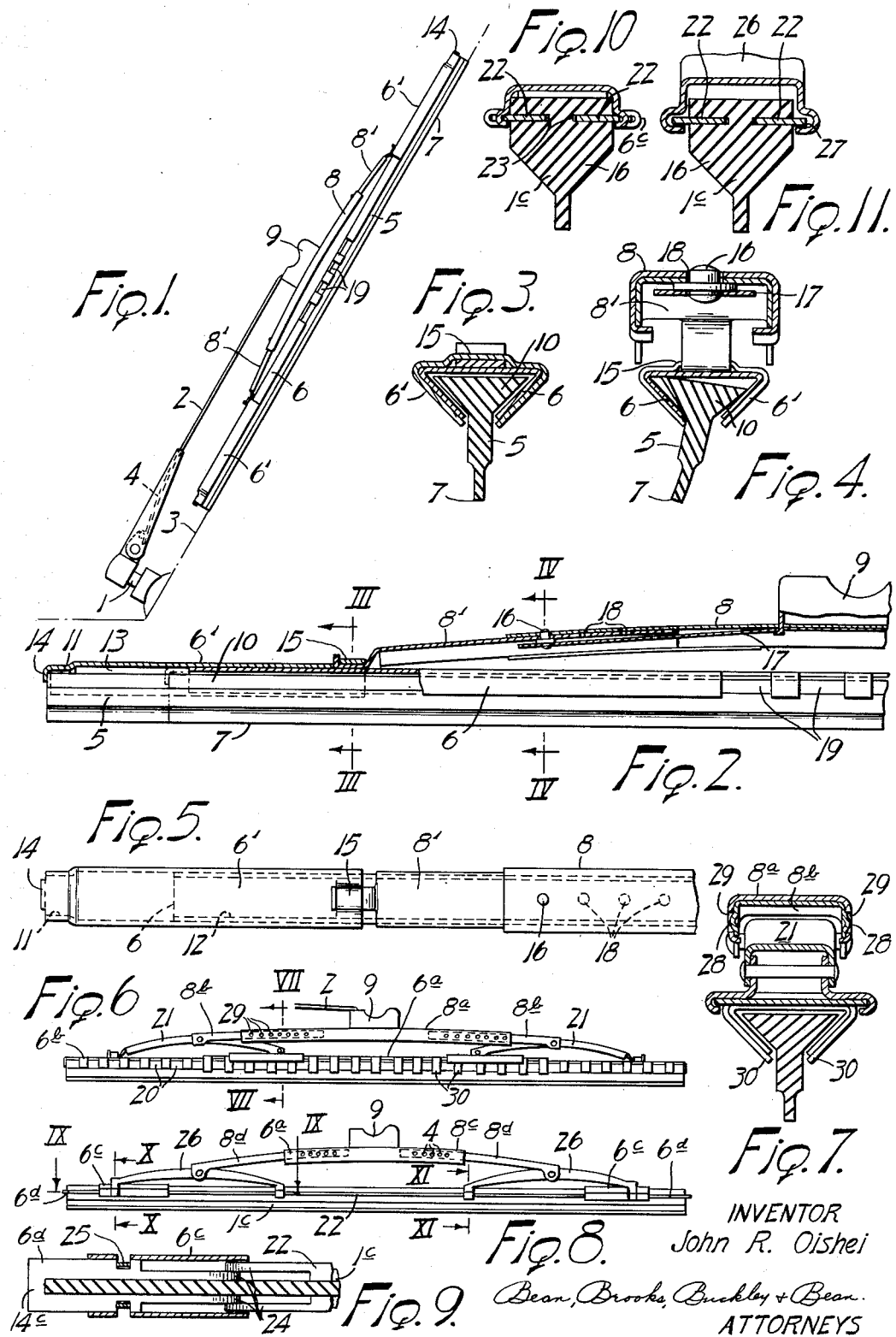
July 26, 1955     J. R. OISHEI     2,713,695
WINDSHIELD WIPER
Filed Dec. 6, 1949
INVENTOR
John R. Oishei
Bean, Brooks, Buckley & Bean
ATTORNEYS United States Patent Office 2,713,695
Patented July 26, 1955

WINDSHIELD WIPER

John R. Oishei, Buffalo, N. Y., assignor to Trico Products Corporation, Buffalo, N. Y.

Application December 6, 1949, Serial No. 131,367

11 Claims. (Cl. 15—245)

This invention relates to the windshield cleaning art and especially to the wiping blade item thereof. Heretofore it has been customary for service stations and dealers in automotive equipment to carry a great variety of wiping blades in order to meet the demands for the article which ranges in size from the shortest to the longest, with some wipers being faster sellers than others. Failure to stock up on all sizes results in a loss of sales.

The primary aim of this invention is to remedy such a condition by providing an adjustable wiping blade which is readily adapted to fit different windshields, and thereby remove the necessity for a large inventory of blades of numerous sizes.

Again, the invention has for its object to provide an adjustable wiper in which provision is made for the proper distribution of the spring urge from the actuating arm in proportion to the dimensional adjustment effected.

The foregoing and other objects will manifest themselves as this description progresses, reference being made therein to the accompanying drawing, wherein:

Fig. 1 is a side view showing a practical application of the invention;

Fig. 2 is an enlarged fragmentary view, partly in longitudinal section more clearly showing the invention;

Figs. 3 and 4 are, respectively, transverse sectional views about on lines 3—3 and 4—4 of Fig. 2;

Fig. 5 is an enlarged fragmentary plan view of the wiper;

Fig. 6 is a side elevation of a modified wiper construction;

Fig. 7 is a cross sectional view about on line 7—7 of Fig. 6;

Fig. 8 is a side view of another blade embodiment; and

Figs. 9, 10 and 11 are detailed sectional showings of such embodiment as viewed about on lines 9—9, 10—10, and 11—11, of Fig. 8.

Referring more particularly to the drawing, the numeral 1 designates the wiper actuating shaft of a windshield cleaner mechanism, and 2 the arm by which the wiper is oscillated on the windshield surface 3 under the urge of its spring 4, in a well known manner.

The wiper has a flexible rubber strip or squeegee 5, a supporting holder 6 therefor, and a superstructure or frame by which the spring urge from the arm is applied to the wiping edge 7 at longitudinally spaced points. This pressure distributing frame, in Figs. 1 and 2, is in the form of an elongate bracket or yoke 8 and has a medially disposed coupler 9 for arm attachment. The holder 6 is of channeled form and conformably fits, though loosely, the generally triangular shaped anchoring enlargement 10 along the back margin of the squeegee. This loose embrace enables the squeegee to float freely within its holder channel and its wiping edge to more easily follow the surface contour of the windshield.

For adjusting the overall length of the wiper, the channel holder 6 is made extensible by means of end sections 6' which telescope over the opposite ends of the holder body. They have sliding and conforming fit on the holder body and their outer end portions are contracted to provide inside wall surfaces 11 which are coplanar with the inner wall surfaces 12 of the holder body for supporting the squeegee at opposite ends of the gap 13 produced in the extended position. A stop wall 14 holds the squeegee against longitudinal displacement from the holder. During this holder adjustment the pressure distributing bracket automatically adjusts itself. This is accomplished by providing extensible arm sections 8' which are connected to the holder sections by a push-pull coupling 15. Thus, whenever the holder is shortened, the bracket will likewise be shortened. This will automatically bring the connections 15 closer together to locate the points of pressure application for better balance. Locking the arm section 8' to its body 8 will also secure the cap section 6' of the holder arrested. For this purpose a spring detent 16, carried by a flat spring 17 on the bracket body 8, engages selectively in the registrable recesses 18 of the overlying parts of the bracket body and the respective extensible arm section. The side walls of the bracket body are medially weakened by notches 19 to provide a hinge portion between the rigid and extensible opposite end portions of the blade. This hinging action between the rigid blade portions permits the latter to follow irregularities found in supposedly flat windshield surfaces.

For cleaning curved window surfaces additional flexibility may be provided not only in the holder but also in the pressure distributing superstructure or frame. In the embodiment shown in Figs. 6 and 7, the increased flexility in the holder 6a is provided by notching the side walls of the holder body and its extensible sections, somewhat as indicated at 20, while for the pressure distributing frame the increased flexibility is afforded by pivotally interposing secondary yokes 21 between the opposite ends of the primary yoke 8a and the holder. In this embodiment, the channeled cap sections 6b telescope within the channeled body of the holder and may abut or overlap at their inner ends in a manner similar to that illustrated in the further modified showing of Fig. 8 wherein the body of the holder 6c adjustably receives the cap sections 6d and an intermediate section 22, each section being formed of parallel stays fitting in the grooves 23 in the opposite sides of the rubber squeegee 1c. The stays of the cap sections may be joined by a transverse stop bar 14c. As shown in Fig. 9, the adjacent ends of the stays of the cap section and the intermediate section 22 have laterally offset extensions 24 which overlap one another to afford a continuous backing support for the wiping edge throughout its length and within the channeled holder body. In both modifications, Figs. 6 and 8, the backing support for the wiping edge is coextensive therewith, the overlap occurring within the holder body to be protected and to form a coplanar supporting surface for the squeegee entirely through the holder body. The holder body, being channeled in cross section, provides a seat on which the cap sections slide. As a means of securement against lengthwise displacement, the holder body is interlocked either to the intermediate section 22 or to the cap sections, as at 25.

In Fig. 8 the secondary yokes 26 are loosely or pivotally connected at their outer ends to the cap sections, by such interlock 25, Fig. 9, while their inner ends slidably interlock with the intermediate section 22 with sufficient play, as at 27, to permit freedom of movement for the squeegee as it conforms to the curved windshield surface.

The extensible arm sections 8b, Fig. 6, and 8d, Fig. 8, are adjustably connected to the bodies of the primary yokes 8a and 8c, respectively, as by detents 28, Fig. 7, engaging selectively in a series of holes 29.

The fingers 30 on the body of the holder 6a, Fig. 7, are extended slightly beyond those on the extensible cap sections so as to lie in planes parallel with the opposite sides of the squeegee for giving support thereto intermediate the cap sections.

By having the pressure distributing frames or yokes extensible and contractible automatically with like adjustments of the cap sections of the holders, the longitudinally spaced points of pressure application on the squeegee will be spaced advantageously for the different overall lengths of the wiper. The adjustment of the cap sections is automatic with the adjustment of the pressure distributing yoke and consequently the points of pressure application will be regulated in accordance with factory prescribed specifications. The desired wiping efficiency will therefore be insured. The adjustable wiper is practical and durable, and while the foregoing description has been given in detail for clarity it is without thought of limitation since the inventive principles involved are capable of assuming other physical embodiments without departing from the spirit of the invention and the scope of the appended claims.

What is claimed is:

1. A windshield wiper comprising an elongate squeegee element having a wiping edge, a holder for the element providing backing support for the edge, and an elongate pressure distributing frame having arm attaching means intermediate its length, said holder having on one end an extensible end section, said frame having an extensible end section connected to the holder section and adjustable therewith as a unit to alter the overall length of the wiper, a connection between the opposite end of the frame and the holder, and means securing one end section in its adjusted position and acting therethrough to hold the other section in a given position.

2. A windshield wiper comprising a flexible squeegee strip having a wiping edge, a channeled holder embracing the strip loosely to enable the same free floating movement therein, said holder having extensible channeled cap sections telescoping the opposite ends of an intermediate body portion and having stop parts obstructing lengthwise displacement of the strip therefrom, and an elongate pressure distributing frame spanning the body portion and having oppositely extending and longitudinally extensible arm sections each connected at its outer end to a cap section for adjustment therewith as a unit.

3. A windshield wiper comprising an elongate squeegee element having a wiping edge, a holder for the element providing backing support for the edge, and an elongate pressure distributing frame having arm attaching means intermediate its length, said holder having an extensible end cap section, said frame having an extensible arm section overlying and connected to the extensible cap section and adjustable therewith as a unit to alter the overall length of the wiper both as to the holder and also to the pressure distributing frame, means connecting together the opposite ends of the holder and frame, and means securing the sections fixed.

4. A windshield wiper comprising an elongate flexible squeegee element having a wiping edge, a channeled holder loosely embracing the squeegee element for free floating movement therein, said holder having extensible channeled cap sections slidably adjustable on the opposite ends of an intermediate body portion, an elongate pressure distributing frame connectible to an actuator and having oppositely extending and longitudinally adjustable arm sections connected at their outer ends to the holder cap sections to form therewith end units independently adjustable, and means fixing the arm sections in their adjusted positions in the frame for securing the units in an operative relation.

5. A windshield wiper comprising an elongate squeegee element having a wiping edge, an elongate holder for the element providing backing support for the edge, an elongate pressure distributing yoke extending lengthwise of the squeegee element with medially arranged arm attaching means and oppositely extending arms, one arm having a section adjustable to extend the yoke, said holder having a section adjustable to extend the same and overlying the arm section, means connecting the opposite ends of the frame to the holder, and common means securing the sections in their adjusted positions.

6. A windshield wiper comprising a flexible squeegee having a wiping edge, a channeled holder embracing the back of the squeegee, said holder having an extensible channeled end cap section, a pressure distributing yoke connectible to an actuating arm and having one end connected to the holder and its opposite end provided with a longitudinally extensible section, and a secondary yoke interposed between and pivotally connecting the cap section to the yoke section for unit adjustment therewith.

7. A windshield wiper comprising an elongate squeegee element having a wiping edge, an elongate holder for the element providing backing support for the edge, and a pressure distributing yoke extending lengthwise of the squeegee element with arm attaching means intermediate its length, said holder and said yoke having extensible sections connected and adjustable as a unit to alter the overall length of the wiper, and common means securing the unit in a given adjustment.

8. A windshield wiper comprising an elongate flexible squeegee having a wiping edge and an anchoring enlargement on its opposite edge with converging sides, a channeled holder embracing the squeegee for free floating movement therein, said holder having extensible channeled cap sections telescoping within the opposite ends of an intermediate body portion, the side walls of the latter extending beyond the side walls of the cap sections to give support to the squeegee between the latter, and a pressure distributing yoke connectible to an actuating arm and having oppositely extending and longitudinally extensible arm sections connected at their outer ends to the cap sections.

9. A windshield wiper comprising an elongate squeegee element having a wiping edge, a holder for the element providing backing support for the edge, and an arched yoke having a medially disposed arm attaching means and its opposite ends connected to the holder at longitudinally spaced points, said holder and yoke having sections adjustable to secure lengthwise extension of the holder while maintaining the connections of the ends of the yoke to the holder.

10. A wiper for either curved or flat windshields, comprising a flexible squeegee having an elongate wiping edge, holder means embracing the squeegee, said holder means having extensible cap sections telescoping the opposite ends of an intermediate body portion and providing continuous backing support for the wiping edge throughout, and an extensible elongate pressure distributing frame having a primary yoke and two secondary yokes interposed between and connecting the ends of the primary yoke to the cap sections of the holder means at longitudinally spaced points.

11. A windshield wiper comprising an elongate flexible squeegee having a wiping edge, a flexible holder for the squeegee, a primary yoke having arm attaching means, said yoke having oppositely extending and longitudinally adjustable arms, and a secondary yoke interposed between each end of the primary yoke and the holder and pivotally connected intermediate its ends to the adjacent extensible arm of the primary yoke, said holder having a body portion and extensible end sections to which one end each of the secondary yokes are connetced respectively, the opposite ends of the secondary yokes being movably connected to the body portion of the holder.

References Cited in the file of this patent

UNITED STATES PATENTS

| | | |
|---|---|---|
| 1,183,463 | Jepson | May 16, 1916 |
| 1,362,801 | Johnson | Dec. 21, 1920 |
| 1,573,618 | Laganke | Feb. 16, 1926 |
| 2,128,454 | Cullin | Aug. 30, 1938 |
| 2,167,207 | Horton | July 25, 1939 |
| 2,596,063 | Anderson | May 6, 1952 |

FOREIGN PATENTS

| | | |
|---|---|---|
| 518,920 | Great Britain | Mar. 12, 1940 |
| 524,165 | Great Britain | July 31, 1940 |